(12) United States Patent
Avetoom

(10) Patent No.: US 11,659,376 B2
(45) Date of Patent: *May 23, 2023

(54) SYSTEMS AND METHODS FOR ROAMING CONFIGURATION MANAGEMENT

(71) Applicant: T-Mobile USA, Inc., Bellevue, WA (US)

(72) Inventor: Paul Avetoom, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/354,001

(22) Filed: Jun. 22, 2021

(65) Prior Publication Data

US 2021/0314760 A1 Oct. 7, 2021

Related U.S. Application Data

(63) Continuation of application No. 16/800,451, filed on Feb. 25, 2020, now Pat. No. 11,082,828.

(51) Int. Cl.
H04W 8/12 (2009.01)
H04W 8/02 (2009.01)

(52) U.S. Cl.
CPC .................... *H04W 8/02* (2013.01)

(58) Field of Classification Search
CPC .................. H04W 8/02; H04W 8/12
See application file for complete search history.

(56) References Cited

U.S. PATENT DOCUMENTS

| | | | |
|---|---|---|---|
| 9,107,038 B1 * | 8/2015 | Marupaduga | H04W 8/02 |
| 9,763,168 B1 | 9/2017 | Zait | |
| 11,082,828 B1 * | 8/2021 | Avetoom | H04W 8/02 |
| 2006/0089140 A1 * | 4/2006 | Zhang | H04W 8/26 |
| | | | 455/432.1 |
| 2006/0123079 A1 | 6/2006 | Sturniolo | |
| 2010/0273478 A1 | 10/2010 | Shon | |

(Continued)

OTHER PUBLICATIONS

Office Action dated Dec. 7, 2020 for U.S. Appl. No. 16/800,451 (pp. 1-11).

(Continued)

*Primary Examiner* — Joseph E Dean, Jr.
(74) *Attorney, Agent, or Firm* — Loeb & Loeb LLP

(57) ABSTRACT

A method for improving roaming configuration efficiency including providing a GUI including roaming configuration data for roaming partner network operators. The method includes receiving, at a roaming configuration management (RCM) server and via the GUI, updated roaming configuration data for a first roaming partner network operator and updated roaming configuration data for a second roaming partner network operator. The method includes applying the updated roaming configuration data for the first roaming partner network operator to a first set of network entity data associated with the first roaming partner network operator and the updated roaming configuration data for the second roaming partner network operator to a second set of network entity data associated with the second roaming partner network operator. The method includes providing the updated roaming configuration data for the first and second roaming partner network operators.

20 Claims, 11 Drawing Sheets

(56) References Cited

U.S. PATENT DOCUMENTS

| | | | |
|---|---|---|---|
| 2014/0269653 A1* | 9/2014 | Gupta | H04W 8/186 370/338 |
| 2016/0381547 A1 | 12/2016 | Jain | |
| 2017/0180997 A1 | 6/2017 | Mildh | |

OTHER PUBLICATIONS

Notice of Allowance dated May 12, 2021 for U.S. Appl. No. 16/800,451 (pp. 1-8).

* cited by examiner

FIG. 4A

| RCMS | Manage Partners | Manage Countries | Manage Areas | Manage RDSP | Manage Scheduler |
|---|---|---|---|---|---|

ALL ROAMING PARTNERS

ADD NEW PARTNER

| PARTNER NAME | COUNTRY NAME | BLOCKED STATUS | STATUS |
|---|---|---|---|
| Search | Search | Search | |
| Partner 1 | Austria | Unblocked | + |
| Partner 2 | Thailand | Blocked | + |
| Partner 3 | Thailand | Blocked | + |
| Partner 4 | United States | Unblocked | + |
| Partner 5 | Norway | Unblocked | + |
| Partner 6 | Afghanistan | Unblocked | + |
| Partner 7 | Afghanistan | Unblocked | + |
| Partner 8 | Sierra Leone | Unblocked | + |
| Partner 9 | Gambia | Blocked | + |
| Partner 10 | Burundi | Blocked | + |
| Partner 11 | United States | Unblocked | + |
| Partner 12 | Uganda | Unblocked | + |
| Partner 13 | India | Unblocked | + |
| Partner 14 | India | Unblocked | + |
| Partner 15 | United States | Unblocked | + |
| Partner 16 | India | Blocked | + |
| Partner 17 | India | Unblocked | + |

| RCMS | Manage Partners | Manage Countries | Manage Areas | Manage RDSP | Manage Scheduler |
|---|---|---|---|---|---|

ALL COUNTRIES

ADD NEW COUNTRY

| COUNTRY | MCCs | COUNTRY CODE | COUNTRY SHORT NAME | MODIFIED | REMOVE |
|---|---|---|---|---|---|
| Search... | | | | | |
| Afghanistan | 412 | 93 | AFG | <date> | <delete> |
| Aland Islands | | 358 | ALA | <date> | <delete> |
| Albania | 276 | 355 | ALB | <date> | <delete> |
| Alderney | | 44 | ALD | <date> | <delete> |
| Algeria | 603 | 213 | DZA | <date> | <delete> |
| American Samoa | 544 | 1,684 | ASM | <date> | <delete> |
| Andorra | 213 | 376 | AND | <date> | <delete> |
| Angola | 631 | 244 | AGO | <date> | <delete> |
| Anguilla | 365 | 1,264 | AIA | <date> | <delete> |
| Antigua and Barbuda | 344 | 1-268 | ATG | <date> | <delete> |
| Argentina | 722 | 54 | ARG | <date> | <delete> |
| Armenia | 283 | 374 | ARM | <date> | <delete> |
| Aruba | 363 | 297 | ABW | <date> | <delete> |
| Australia | 505 | 61 | AUS | <date> | <delete> |
| Austria | 232 | 43 | AUT | <date> | <delete> |
| Azerbaijan | 400 | 994 | AZE | <date> | <delete> |
| Bahamas | 364 | 1,242 | BHS | <date> | <delete> |

| RCMS | Manage Partners | Manage Countries | Manage Areas | Manage RDSP | Manage Scheduler |
|---|---|---|---|---|---|

ALL ROAMING SUBSCRIPTION INFO

| RSI NAME | RSI TYPE | MODIFIED | MODIFIED BY | STATUS |
|---|---|---|---|---|
| Search... | All | Search... | Search... | All |
| RSI Name 1 | LTE_VPLMNID | <date> | Admin 1 | |
| RSI Name 2 | 2G-3G | <date> | Admin 2 | |
| RSI Name 3 | 5G | <date> | Admin 3 | |
| RSI Name 4 | LTE_MME | | | |
| RSI Name 5 | 2G-3G | <date> | Admin 1 | |
| RSI Name 6 | 5G | <date> | Admin 3 | |
| RSI Name 7 | LTE_VPLMNID | <date> | Admin 2 | |
| RSI Name 8 | 2G-3G | | | |
| RSI Name 9 | 5G | <date> | Admin 1 | |
| RSI Name 10 | LTE_MME | | | |
| RSI Name 11 | LTE_VPLMNID | <date> | Admin 3 | |
| RSI Name 12 | 2G-3G | <date> | Admin 3 | |
| RSI Name 13 | 5G | | | |
| RSI Name 14 | 2G-3G | <date> | Admin 2 | |
| RSI Name 15 | 5G | <date> | Admin 3 | |
| RSI Name 16 | LTE_VPLMNID | | | |
| RSI Name 17 | 2G-3G | <date> | Admin 1 | |

SYSTEMS AND METHODS FOR ROAMING CONFIGURATION MANAGEMENT

CROSS-REFERENCE TO RELATED APPLICATIONS

This application is a continuation of U.S. application Ser. No. 16/800,451, filed Feb. 25, 2020, the disclosure of which is incorporated by reference herein in its entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Mobile roaming may extend the coverage of a cellular network operator's services allowing a mobile user to continue using its home operator phone number, data services, and other network services while outside of a user's home network's operating region. To enable seamless coverage to mobile users while roaming to different geographic regions, a user's home network operator may have agreements in place between various visiting network operators that may address technical components of the roaming service. When a mobile user connects to a visiting network operator's network, the visiting operator may identify the mobile user's home network operator in order to determine how or if to proceed with providing network services.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for improving roaming configuration efficiency. The method may include receiving roaming configuration data for one or more network operators and receiving network entity data associated with a roaming area. The method may include associating a first set of network entity data with a first network operator of the one or more network operators and a second set of network entity data with a second network operator of the one or more network operators. The method may include receiving updated roaming configuration data for the first network operator, and applying the updated roaming configuration data for the first network operator to the first set of network entity data in the roaming area. The method may include receiving updated roaming configuration data for the second network operator, and applying the updated roaming configuration data for the second network operator to the second set of network entity data in the roaming area. The method may also include providing the updated roaming configuration for the first and second network operator in a graphical user interface.

In another embodiment, the disclosure describes a computer-implemented method of improving roaming configuration efficiency. The method may include receiving roaming configuration data for one or more network operators and receiving network entity data associated with a roaming area. The method may include associating each of the one or more network operators with a portion of the network entity data, and providing a graphical user interface including at least a list of the one or more network operators, the roaming configuration data for the respective one or more network operators, and the roaming area. The method may include providing, in the graphical user interface, at least one field for receiving updated roaming configuration data for each of the one or more network operators. The method may include receiving, via the at least one field for receiving updated roaming configuration data in the graphical user interface, updated roaming configuration data for at least one of the one or more network operators. In response to receiving the updated roaming configuration data for the at least one of the one or more network operators, the method may include applying the updated roaming configuration to the portion of the network entity data associated with the at least one of the one or more network operators. The method may also include providing the updated roaming configuration for the at least one of the one or more network operators in the graphical user interface.

In another embodiment, the disclosure describes a computer-implemented method of improving roaming configuration efficiency. The method may include receiving roaming configuration data for one or more network operators and receiving network entity data, wherein each of the one or more network operators is associated with a portion of the network entity data. The method may include providing a graphical user interface including at least a list of the one or more network operators and the roaming configuration data for the respective one or more network operators. The method may include providing, in the graphical user interface, a field for receiving updated roaming configuration data for each of the one or more network operators. The method may include receiving, via a first field for receiving updated roaming configuration data associated with a first network operator of the one or more network operators, a first roaming configuration update including an instruction to block roaming access for the first network operator in a first roaming area. The method may include receiving, via a second field for receiving updated roaming configuration data associated with a second network operator of the one or more network operators, a second roaming configuration update including an instruction to unblock roaming access for the second network operator in a second roaming area. In response to receiving the first roaming configuration update, the method may include blocking roaming access for the portion of the network entity data associated with the first network operator in the first roaming area. In response to receiving the second roaming configuration update, the method may include unblocking roaming access for the portion of the network entity data associated with the second network operator in the second roaming area. The method may also include providing the first and second roaming configuration updates in the graphical user interface.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 4A is an exemplary embodiment of a graphical user interface for use in the roaming configuration management system in accordance with the disclosure;

FIG. 4B is an exemplary embodiment of a graphical user interface for use in the roaming configuration management system in accordance with the disclosure;

FIG. 4D is an exemplary embodiment of a graphical user interface for use in the roaming configuration management system in accordance with the disclosure;

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 1:
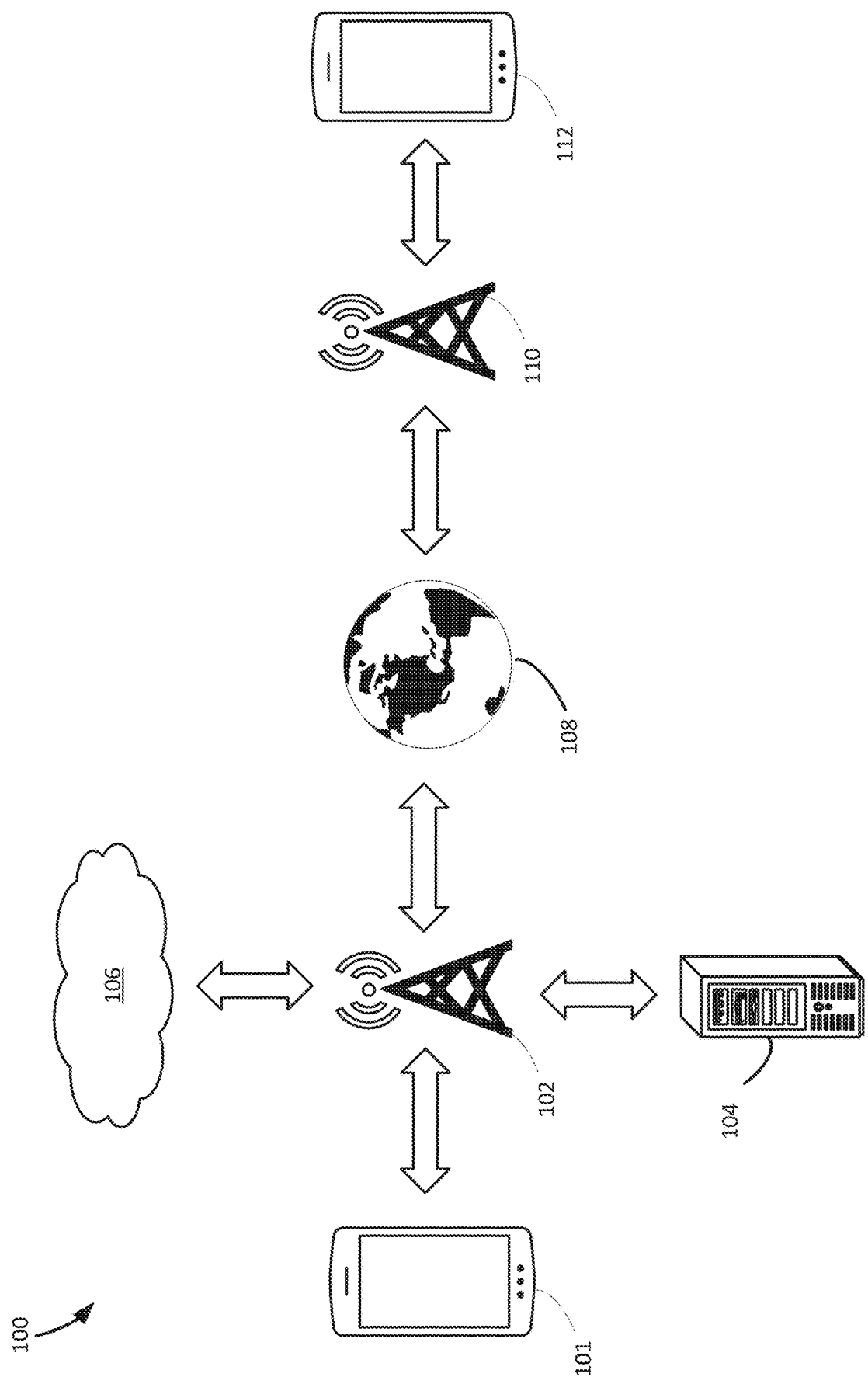
FIG. 1 is a high level diagram of an embodiment of a roaming network in which a roaming configuration management system may operate in accordance with the disclosure.

Network operators or providers, such as entities providing cellular phone and data service, may use various hardware, software, or other tools and systems to provide systems and methods to manage roaming configuration. Most network operators may have agreements in place with other network operators so that mobile users of each network may experience relatively seamless network access when traveling outside of a user's home network operating region. The agreements between partner network operators may include technical and financial details regarding how mobile users from each respective home network may be provided (or not provided) with services when accessing a visiting network while roaming. FIG. 1 shows a high level illustration of a roaming network 100 that may allow a user with a computing device 101 associated with a home network 110 to access network services via a visiting network 102. The computing device 101 may connect to the visiting network 102, and the visiting network operator may access a home location register 104 or similar database or directory to determine whether the computing device 101 may be associated with another network operator. In some embodiments, the visiting network operator may determine that the computing device 101 is associated with a home network operator with which the visiting network operator has a roaming agreement. In some embodiments, if the computing device is attempting to contact a computing device of another user (e.g., phone call, SMS, MMS, etc.), the visiting network 102 may route the call or message through an international transit network carrier 108 and onto the home network 110. The home network 110 may then be used to contact the call, message, or other data to a recipient computing device 112. In some embodiments, the recipient computing device 112 may be associated with another third party network provider that may be utilized to complete the network communication. In some embodiments, if the computing device is accessing data on an exterior network 106, such as the Internet, the visiting network 102 may route the computing devices 101 data request to the exterior network 106 upon determining that the visiting network operator has an agreement in place with the home network operator associated with the computing device 101. Those skilled in the art will understand that many variations of the components shown in FIG. 1 may be utilized in different embodiments, and that the roaming network 100 is merely exemplary.

An operator's home location register (HLR), such as the home location register 104 in FIG. 1, may be configured to specify roaming areas that may include/contain integrated services digital network (ISDN), mobile station ISDN (MSISDN), or visiting public land mobile network (VPLMN) identification (VPLMN-ID) for mobile users and their corresponding mobile computing devices. Traditionally, an operator's HLR may not be configured to group these identifiers in any operator specific way. Accordingly, the network operator associated with the HLR (or an administrator or application accessing the register) may not have any convenient way to determine which operator each ISDN or VPLMN-ID may be associated with. In other words, the HLR may not be traditionally configured to link particular ISDNs or VPLMN-IDs, or groups of each, with the mobile country code/mobile network code (MCCMNC) combination that may identify the mobile user's home network operator among various network operators. As a result, managing sets of ISDNs or VPLMN-IDs that belong to a specific operator may be very time consuming or substantially impossible in certain circumstances. Similarly, in systems or networks that may include a policy and charging rules function (PCRF) or policy control function (PCF) (e.g., 5G networks), the PCRF or PCF configuration may maintain individual internet protocol (IP) addresses for each computing device that connects to the network and MCCMNC values associated with the various network operators, and corresponding location and quality of service (QoS) information. Traditionally, however, the PCRF or PCF may not group the IP addresses and associated information based on each underlying computing device's home network operator.

Thus, in some embodiments, the disclosure describes a roaming configuration management system (RCMS) that may enable more efficient and streamlined roaming configuration processes. To do so, the RCMS may introduce an external abstraction of a Roaming Partner that may group ISDNs and VPLMN-IDs together that may enable improved management of a single network operator. For example, the RCMS may aggregate various network entities by type, such as global title (GT), mobile management entity (MME), MCCMNC/VPLMN-ID, access and mobility management function (AMF), session management function (SMF), and virtually any other roaming based aggregated data that may be defined by an operator and that may be configured in the network operator's systems associated with another operator or country. In some 5G networks, for example, the AMF may receive connection and session related information from the user computing device 101, and messages related to session management may be forwarded to the SMF. Further, the RCMS may allow a user to manage core network systems configuration based on the aggregated values or network entities. The RCMS may aggregate AMF/SMF values within a roaming area associated with network operators. In some embodiments, the RCMS may manage, store, and/or configure network associated IR.21 roaming partner data and information used in an operator's network. The IR.21 may be a document or repository that may include thousands of entries by various network operators. The IR.21 may also include details of mobile network operators and contain IP ranges, mobile application part (MAP) addresses, global titles, network codes, etc., for the equipment associated with each particular network operator. This information may be updated periodically, such as daily, weekly, or monthly. In some embodiments, the RCMS may help integrate the updated IR.21 information more efficiently and more quickly. In some embodiments, the RCMS may also maintain IP address ranges and associated values that may facilitate PCRF or PCF management.

In some embodiments, the RCMS may provide various external interfaces, such as a web interface for enabling administrators to update the system, and a southbound interface for access by external applications. In some embodiments, the RCMS and its interfaces may allow performance of all or most permissible roaming configuration actions within the core network elements. In some embodiments, the RCMS may also manage configuration of Roaming Dependent Service Profiles (RDSP) in the home location register/home subscriber server (HLR/HSS), which may be a custom set of rules per operator.

Accordingly, the RCMS may provide a technical solution to various technical problems. The RCMS may allow network operators to more efficiently configure and manage changes in roaming configurations while using fewer computer resources. The RCMS may allow network operators the ability to react substantially immediately (or at least more quickly) to network operator pricing changes (e.g., from roaming partners), when notified by the other network operator. Traditionally, rolling out changes to roaming configurations across an operator network could be time consuming and resource intensive (both computer and human). Thus, one practical application of the RCMS described herein may be faster and more resource efficient roaming configuration changes in response to various inputs.

In some embodiments, the RCMS may provide other technical solutions. For example, the RCMS may be a tool that may provide a centralized, web-based platform or tool for a network operator to facilitate management of global title (GT) and/or ISDN and IP ranges for other network operators (e.g., roaming partners), and/or facilitate management of the VPLMN-IDs for roaming partners. In some embodiments, the RCMS may facilitate management of the mobility management entity (MME) for LTE roaming or other types of roaming. In some embodiments, the RCMS may enable relatively rapid blocking and unblocking of roaming partners in response to circumstances related to those partners, such as partnership agreement terms, etc, and may also enable rapid blocking and unblocking of particular roaming areas as needed or desired by a network operator. In some embodiments, the RCMS may facilitate addition and removal of ISDN/GT from particularly roaming partners, and/or binding or linking roaming partners with a roaming area as a many-to-many relationship. Further, in some embodiments, the RCMS may enable backtracking of configuration changes with a history of changes completed along with comments and dates associated with those changes. Other benefits and solutions to technical problems will be evident from the disclosure.

Figure 2:
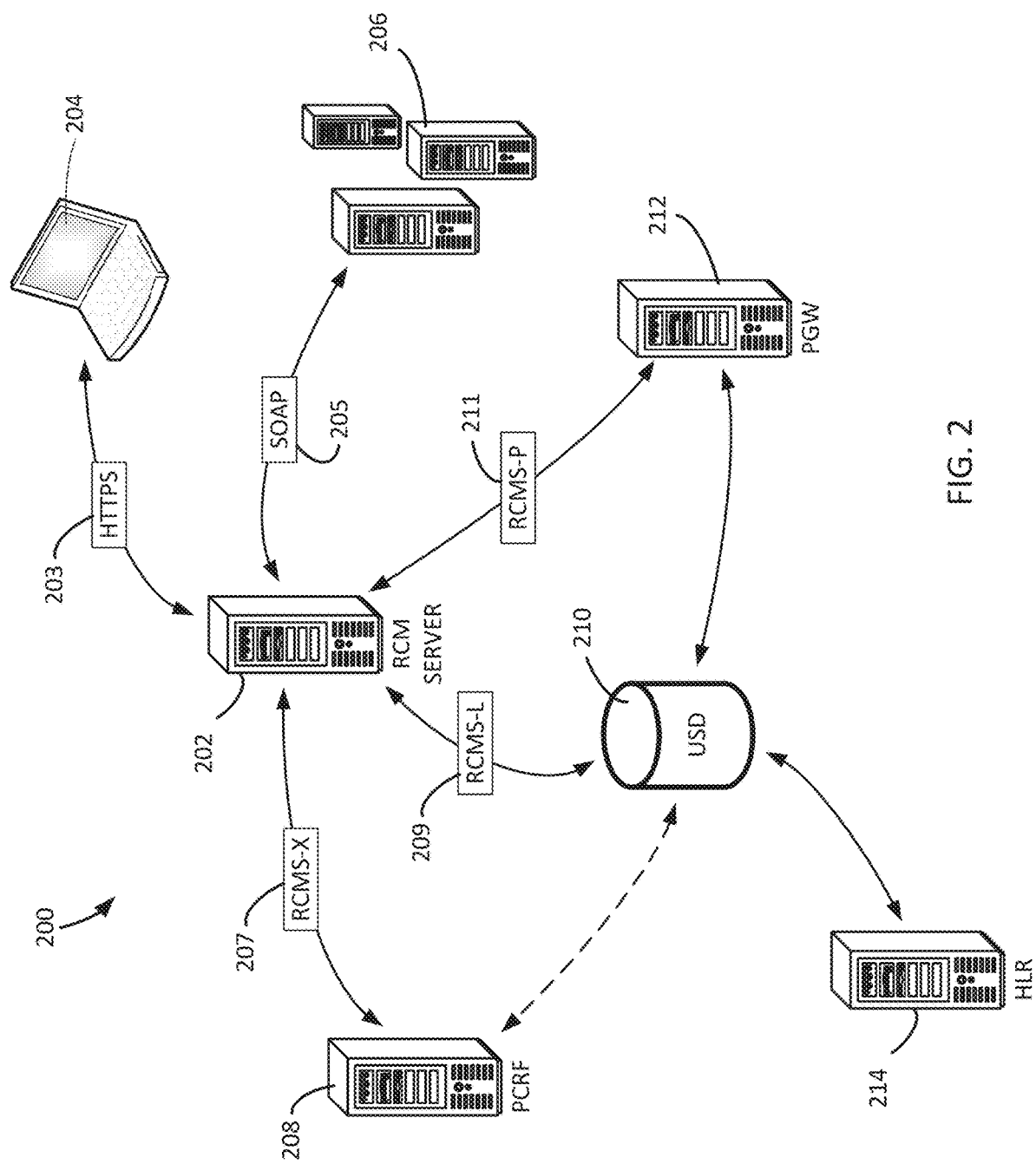
FIG. 2 is a diagram of components of an exemplary computing environment in which the roaming configuration management system my operate in accordance with the disclosure.

FIG. 2 illustrates an embodiment of an exemplary computing environment 200 in which the roaming configuration management system may exist and operate. A roaming configuration management (RCM) server 202 may be in communication with or accessible by at least one or more administrator computers 204, one or more application servers 206, one or more policy and charging rules functions (PCRF) 208 (on servers or other computing environments), one or more unified subscriber directories or databases (USD) 210, and one or more provisioning gateways (PGW) 212. In some embodiments, such as those embodiments that may include 5G networks, the PGW 212 may be replaced or supplemented by an access mobility management function (AMF) and/or session management function (SMF) or a combination AMF/SMF, and the PCRF may be replace by a PCF that may be connected to and communicate with the AMF/SMF. The various connections may be made in any suitable manner known to those skilled in the art, such as fixed wire, wireless, or networked through an intranet or the internet (i.e., world wide web), or any other suitable network connection. The RCM server 202 may, in some embodiments, be specifically configured to operate the RCMS as otherwise described herein. In some embodiments, the USD 210 may also be accessible by or have access to one or more home location registers 214, as well as the PGW 212 and the PCRF 208.

In some embodiments, an RCMS-L reference point 209 may be disposed between the RCM server 202 and the USD 210. The RCMS-L reference point 209 may enable the RCM server 202 to store and retrieve data used to support the management of roaming information. In some embodiments, this roaming information may include information related to roaming partners (e.g., other network operators), roaming areas, roaming dependent services profiles, and scheduled tasks. In some embodiments, the RCMS-L reference point may be implemented in lightweight directory access protocol (LDAP), but other suitable protocols may be used within the scope of the disclosure. In some embodiments, an RCMS-P reference point 211 may be disposed between the RCM server 202 and the PGW 212. The RCMS-P reference point 211 may enable the RCM server 202 to update the HLR 214 configuration as needed or desired based on changing information related to the HRL data. In some embodiments, the RCMS-P reference point may be implemented in simple object access protocol (SOAP), but other suitable protocols may be used within the scope of the disclosure. In some embodiments, an RCMS-X reference point 207 may be disposed between the RCM server 202 and the PCRF 208. The RCMS-X reference point 207 may enable the RCM server 202 to update IP address ranges, MCCMNC value for roaming partners or other network operators, QoS references, location references, etc. In some embodiments, this information may alternatively or additionally be stored on the USD 210, but in some embodiments, this information may be stored exclusively on the PCRF 208 and not on the USD 210.

In some embodiments, the RCMS, via the RCM server 202, may provide both a web interface and a SOAP interface to facilitate managing roaming configurations for the network operator. In some embodiments, the web interface may be implemented via Hypertext Transfer Protocol Secure (HTTPS) through an HTTPS reference point 203. In some embodiments, the web interface may be accessed by administrator computers 204 of administrators associated with the network operator. The SOAP interface may be implemented through a SOAP reference point 205. In some embodiments, the SOAP interface may be accessed by other applications housed on other application servers 206.

In some embodiments, the RCM server 202, via both the web interface and the SOAP interfaces, may provide users with the ability to perform a variety of functions in the following non-limiting list:

Whitelist and/or blacklist a roaming area.
Add a new roaming partner and/or delete a roaming partner.
Block and/or unblock a roaming partner.
Assign a roaming partner a default location reference.
Assign a roaming partner a default QoS.
Assign QoS or location reference to a roaming partner's MCC/MNC or IP address range.
Unassign QoS or location reference from roaming partner's MCC/MNC or IP address range.
Add and/or remove IP address range (either IPv4 or IPv6) for a roaming partner (may include optional QoS and location reference).
Add and/or remove a MCC value for a roaming partner.
Add and/or remove an MNC value for a roaming partner.
Add and/or remove a country code (CC) value for a roaming partner.
Add and/or remove a network destination code (NDC) value for a roaming partner.
Add and/or remove a VPMLN-ID or ISDN for a roaming partner.
Add and/or remove MME Address for a roaming partner.
Add and/or remove a MME roaming area.
Block and/or unblock a MME roaming area.
Associate and/or disassociate a roaming partner with an MME roaming area.
Add and/or delete a roaming area.
Block and/or Unblock a roaming area.
Associate and/or disassociate a roaming partner with a roaming area.
Create and/or delete a roaming subscription.
Create, modify, and/or delete a roam plan information entry.
Create, modify, and/or delete a roam plan.
Create, modify, and/or delete any of four roam entries specifying roaming treatments:
Basic service;
Supplementary service;
Operator determined barring (ODB) related; and
Customized Application for Mobile networks Enhanced Logic (CAMEL) related.
Register and/or unregister a roaming partner with a roaming subscription.
Search for entries associated with a QoS or location reference (locRef) values.
Locate roaming plans by searching for complete or partial names or for plans that use named treatments.
Display a history of changes made to roaming management configurations.

In some embodiments, the functionalities in the below non-limiting list may only be available via the web interface, or through both the web interface and SOAP interfaces in other embodiments:

Mobile Country Code (MCC) management:
Ability to create, modify and delete MCCs, and/or ability to search for MCCs based on country name.
Locate roaming partner information by searching for complete or incomplete values of Name, MCC, MNC, CC, NDC, IP address, QoS, location reference. In some embodiments, the interface may provide for selecting which roaming partner information is displayed in a summary, chosen from all roaming partner values. In some embodiments, the interface may provide for selecting any roaming partner entry and displaying complete information for that roaming partner.
Search an identified roaming partner for an ISDN or VPMLN-ID (partial or complete).
Locate roaming areas by searching for complete or partial names, with results displaying the list of associated ISDNs and/or VPLMN-IDs, and whether the geographic area is blacklisted or whitelisted.

In some embodiments, the abstraction of Roaming Partner may refer to a name given to a single or group of MCC-MNC combinations. In some embodiments of the RCMS, each roaming partner may have the following non-exclusive list of properties:

At least one mobile country code (MCC).
A set of mobile network codes (MNCs) per MCC.
At least one country code (CC).
A set of network destination codes (NDCs) per CC.
A set of ISDNs.
A set of VPLMN-IDs.
A set of associated roaming subscription plans.
A default standard roaming plan.
A default routing roaming plan.

Figure 3:
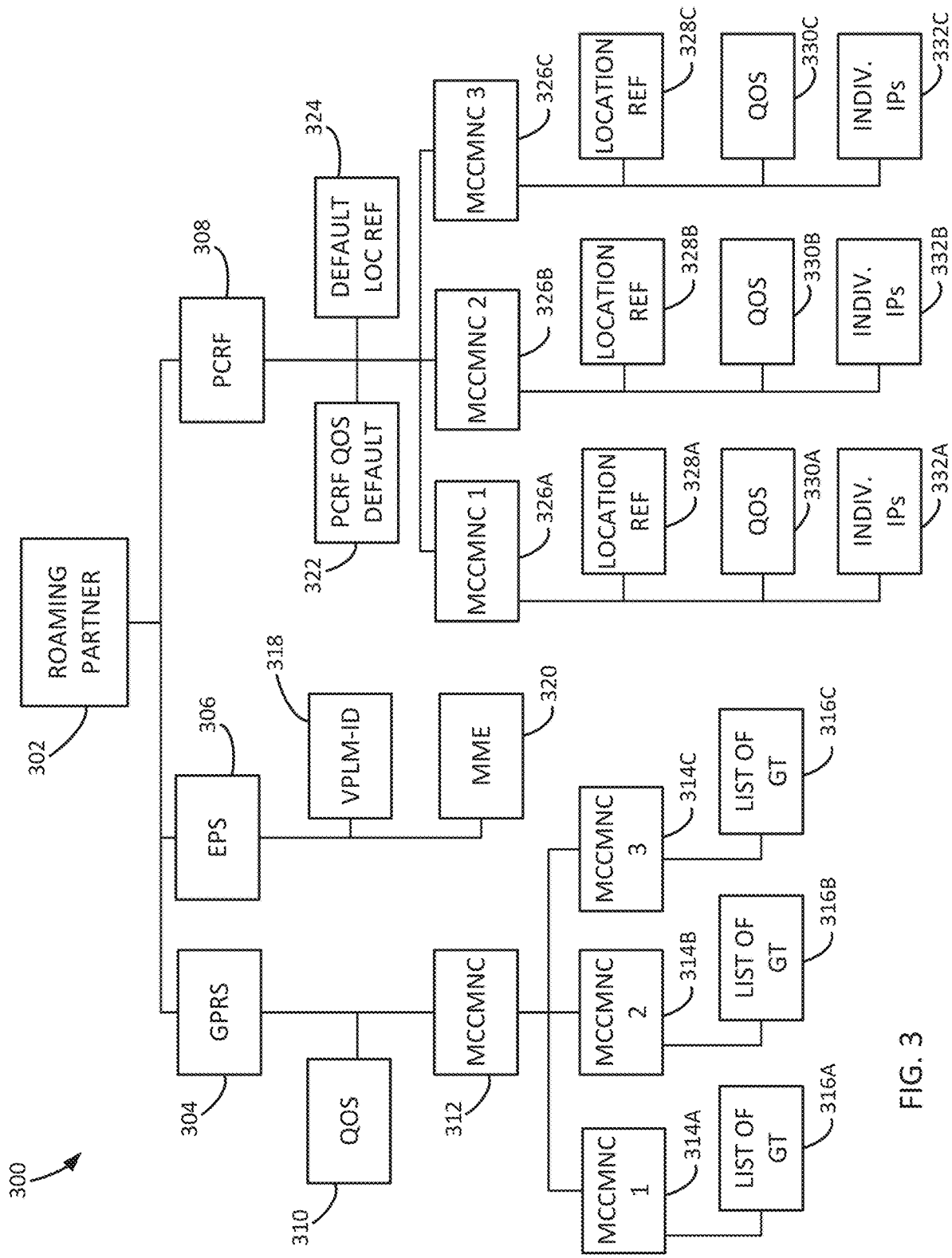
FIG. 3 is an embodiment of a data structure that may be used to represent a roaming partner in the roaming configuration management system in accordance with the disclosure.

FIG. 3 shows an embodiment of a data structure or data tree 300 that may be used to represent a roaming partner 302. The roaming partner 302 data may be identified and grouped in any of the GPRS 304, EPS 306, or PCRF 308 domains. Under GPRS 304 (e.g., GSM networks), each roaming partner may be associated with quality of service (QoS) 310 data that may be applicable to users under the particular roaming partner's network. The MCCMNC 312 is a combination of a mobile country code (MCC) and a mobile network code (MNC), and may include a unique combination of values that identifies the network operator name. In other words, in some embodiments, the MCCMNC 312 may only be associated with one roaming partner. In some embodiments, checks may be made or automated to ensure that duplicate MCCMNCs are not created across multiple roaming partners. It may, however, be possible for a roaming partner to have multiple MNCs (mobile network codes) associated with that particular roaming partner. In some embodiments, the MCC may include three decimal digits and the MNC may include two or three decimal digits (e.g., an MNC of 001 is not the same as MNC of 01). In some embodiments, the first digit of the mobile country code may identify a geographic region as follows, where the digits 1 and 8 are not used:

0—Test networks
2—Europe
3—North America and the Caribbean
4—Asia and the Middle East
5—Australia and Oceania
6—Africa
7—South and Central America
9—Worldwide (e.g., satellite, aboard aircraft, maritime, Antarctica)

In some embodiments, an MCC may be used in combination with an MNC to uniquely identify a network operator using the GSM, UMTS, LTE, 5G, CDMA, or other public land mobile networks. In some embodiments, a roaming partner 302 may be associated with multiple MCCMNCs due to the possibility that a roaming partner may have multiple MNCs associated with it. Accordingly, each MCCMNC 312 associated with the roaming partner 302 may include a list of global titles (GT) associated with a particular MCCMNC. For example, FIG. 3 shows a roaming partner that includes three MCCMNCs with associated lists of GTs: MCCMNC 1 (314A) associated with list of GT 316A, MCCMNC 2 (314B) associated with list of GT 316B, and MCCMNC 3 (314C) associated with list of GT 316C, although more or few MCCMNCs may be used per roaming partner. A global title may be an address used for routing signaling messages on the network. In some embodiments, the global title may be a unique address which refers to only one destination (e.g., user computing device).

Under the EPS (evolved packet system) 306 domain (e.g., LTE networks), a VPLM-ID 318 may be substantially the equivalent to the MCCMNC in the GPRS domain and associated with an mobility management entity (MME) 320. Similarly, the VPLMN-ID 318 may be associated with only one roaming partner. In some embodiments, the MME 320 may be a control node for the LTE network and may be responsible for idle mode user equipment paging and tagging procedure, including retransmissions. The MME 320 may also be responsible for authenticating users (e.g., by interacting with the HSS). In some embodiments, ISDN may be a number provided as a range of ISDN or just one ISDN for a particular roaming partner. In some embodiments, in the GPRS 304 domain (e.g., for 2G and 3G networks), the ISDN or range of ISDNs may be referred to.

The PCRF 308 may provision IP or IP ranges related roaming partners and assign QoS and Location Reference (LocRef) at the roaming partner level and/or at each IP level. Each roaming partner 302 may have a PCRF QoS Default 322 as a default quality of service for that roaming partner, and a default location reference 324, The PCRF 308 may also include data for multiple MCCMNCs for a particular roaming partner such as MCCMNC 1 (326A), MCCMNC 2 (326B), MCCMNC 3 (326C). In some embodiments, IP ranges associated with the roaming partner for a particular MCCMNC may be expressed as IP Range/32. Each MCCMNC or IP Range may also include location refs 328A, 328B, and 328C, respectively, as well as quality of service data 330A, 330B, and 330C, respectively. In some embodiments, the IP range may also include the individual IPs 332A, 332B, and 332C for each IP range. In some embodiments, the RCMS user or admin may provide IP ranges in a subnet format via an interface and the RCMS tool may internally store individual IP and may allow changing location references and QoS references (locref and qosref) for each individual IP. In some embodiments, the locref and qosref for each IP may be stored in a mapping table. In some embodiments, a user or admin may search a single IP or range associated with a roaming partner across all roaming partners. In some embodiments, duplicate IPs may not be supported and the RCMS may support IPV4 and IPV6 ranges.

In some embodiments, the location reference or "locref" may be specific to the PCRF 308, and may be stored (or additionally stored) at the PCRF, such as PCRF 208 in FIG. 2. In some embodiments, the RCM server 202 may receive a distinct list of locref values to be stored as a master list for use with the RCMS. In some embodiments, the locref field may be associated at the roaming partner level, at the IP range level, or even at a specific IP level. In some embodiments, a user or admin accessing the RCMS may choose a locref value from the master list to be applied on the roaming partner, IP range, or specific IP level. In some embodiments, when the RCM server 202 or the RCMS is updated (using a sync tool or other data update), the locref values from the PCRF 208 may be retrieved and may override the entries stored on the RCM server 202 or an RCMS database associated with the RCMS. Thus, the locref values may be made to be synchronized across the RCM server 202 and the PCRF 208. In some embodiments, an admin or other authorized user may create new roaming partners with new associated location references that may be entered into the PCRF 208 to add to the master list. In some embodiments, a new roaming partner may be added an existing location reference, and multiple roaming partners may be associated with one location reference. In some embodiments, a roaming partner may be removed from a location reference. In some embodiments, cross-checks may be in place to avoid or limit the ability to remove a location reference from the RCMS if the location reference Is mapped to any of the roaming partners. In some embodiments, when a new roaming partner is being created, the accessible roaming locations and descriptions may be available on the RCMS interface in a drop down list, for example, for single selection.

In some embodiments, the single selection during set up of a new roaming partner may become the default location reference for the roaming partner, such as default loc ref 324 for the roaming partner 302 in FIG. 3. In some embodiments, when an MCCMNC or IP Address/Range is added to a roaming partner (e.g., MCCMNC 1 326A in FIG. 3), a different location reference may be defined to the MCCMNC or IP Address/Range than the default location reference for that roaming partner, the default location reference may be overridden for that specific entry. In some embodiments, if the default location reference is changed for a roaming partner, then the location references that may be the same for the previous default (e.g., not previously overridden) may be changed to the new default location reference. In some embodiments, if the user or administrator wants to update all location references associated with a particular roaming partner to match a new default location reference value, the RCMS interface may include a confirmation inquiry, such as a pop-up question, to be selected to confirm the override. In some embodiments, a previous number of location states (e.g., the previous three location reference values) may be stored in the RCM server 202 along with dates of change for each roaming partner or sub-entry associated with the roaming partner. In some embodiments, the RCMS interface may enable a user to search for one or all or a subset of entries associated with a roaming partner or location reference.

In some embodiments, the QoS reference or "qosref" value may be specific to the PCRF 308, and may be stored (or additionally stored) at the PCRF, such as PCRF 208 in FIG. 2. In some embodiments, the RCM server 202 may receive a distinct list of qosref values to be stored as a master list for use with the RCMS. In some embodiments, the qosref field may be associated at the roaming partner level, at the IP range level, or even at a specific IP level. In some embodiments, the PCRF QoS default 322 may be assigned by default to all members of the MCCMNC in the PCRF. In some embodiments, when the RCM server 202 or the RCMS is updated (using a sync tool or other data update), the qosref values from the PCRF 208 may be retrieved and may override the entries stored on the RCM server 202 or an RCMS database associated with the RCMS. Thus, the qosref values may be made to be synchronized across the RCM server 202 and the PCRF 208.

In some embodiments, the default QoS may be overridden for a roaming partner, which may change qosref values for those values that have not been previously overridden with non-default values. In some embodiments, if the user or administrator wants to update all qosref values associated with a particular roaming partner to match a new default qosref value, the RCMS interface may include a confirmation inquiry, such as a pop-up question, to be selected to confirm the override. In some embodiments, different qosref values may be assigned to a MCCMNC or IP ranges associated with a roaming partner in the PCRF 208. In some embodiments, if a new IP entry, IP range, or MCCMNC may be added to the PCRF 208 or RCMS database under a particular roaming partner and the QoS is not specifically defined, the QoS default 322 associated with the particular roaming partner 302 may be assigned. The default qosref value may subsequently be changed for an MCCMNC or IP range, or specific IP. In some embodiments, a previous number of qosref states (e.g., the previous three qosref values) may be stored in the RCM server 202 along with dates of change for each roaming partner or sub-entry associated with the roaming partner. In some embodiments, the RCMS interface may enable a user to search for one or all or a subset of entries associated with a roaming partner or qosref value.

In some embodiments, the locref and qosref values for each entity may be stored at the PCRF 208 in a mapping table. Table 1 may be an example of a mapping table stored on a PCRF:

TABLE 1

| | |
|---|---|
| MCCMNC1 | locref |
| | qosref |
| MCCMNC2 | locref |
| | qosref |
| MCCMNC3 | locref |
| | qosref |

In some embodiments, an entry of a new or existing roaming partner may become invalid if an already-mapped MCCMNC or ISDN or VPLMN-ID with one another. Table 2 shows examples of combinations of MCCMNC and ISDN values that may render a roaming partner entry invalid:

TABLE 2

| | | | |
|---|---|---|---|
| Roaming Partner 1 | MCCMNC1 | ISDN1 | Valid |
| Roaming Partner 1 | MCCMNC1 | ISDN2 | Valid |
| Roaming Partner 1 | MCCMNC2 | ISDN1 | Invalid |
| Roaming Partner 2 | MCCMNC3 | ISDN1 | Invalid |
| Roaming Partner 2 | MCCMNC1 | ISDN4 | Invalid |

In Table 2, for example, a Roaming Partner 1 entry may become invalid when already-mapped ISDN1 is paired with MCCMNC2. Similarly, a Roaming Partner 2 entry may become invalid when already mapped ISDN1 is paired with MCCMNC3, or when ISDN4 is paired with already-mapped MCCMNC1. Of course, those skilled in the art will recognize that the relationships in Table 2 are for illustration purposes only.

In some embodiments, the RCMS may include certain high level operation sequences. For example, it may be desirable to sync roaming partner and roaming area configuration in the RCM server 202 or RCMS database from other corresponding environments before any operations. In some embodiments, an admin accessing the RCM server via RCMS interface may access individual PGW 212, PCRF 208, or AMF/SMF systems to update roaming area or roaming partner configuration, so syncing may be desirable to make sure the corresponding RCMS database values are updated. Backups may be created to facilitate rollbacks in case of errors. In some embodiments, one possible operation sequence may be sync, apply operation, and rollback (in case of failure). In some embodiments, the sync process may be defined as follows:

Obtain the latest roaming configuration, such as from the PGW 212 or AMF/SMF;

Take backup of PGW configuration and RCMS equivalent data of the same entity;

Compare PGW configuration data with the current configuration data in the RCMS database;

If no problems, apply the change in the RCMS database to match the PGW configuration data; or If conflicts, cancel the operation and make sure RCMS configuration was not changed.

In some embodiments, changes in roaming configuration made using the RCMS interface or otherwise through the RCM server 202 may be scheduled as a job. In some embodiments, the user or administrator requesting the changes may schedule a particular date and time for the changes to apply in the respective system. Once requested, the RCMS may review the scheduled jobs and may reject or approve the change request based on certain predetermined criteria. Once a particular job is scheduled and approved, the job may proceed and may be successful or may fail. In some embodiments, if all the requested changes to the roaming configuration were applied successfully, the status of that job may be changed to "pass." If errors occur during any phase of the operation sequence (such as the operation sequence listed above), the job status may be changed to "fail." In some embodiments, if a requested job is not approved by a particularly predetermined time or by that job's scheduled time, the RCMS may provide for the admin or user who requested the job to resubmit the job with a new date and time.

In some embodiments, particularly in embodiments that may include 5G networks, the roaming configuration changes or updates may be applied so as accommodate network slice management. Network slicing may be used in some embodiments to accommodate varying QoS requirements for varying types of uses and users on the same network infrastructure. To the extent that roaming configuration may include changes to the QoS or other service level requirements (SLA) involve in network slice management, the RCMS may be implemented to deploy changes or updates to that configuration. In some embodiments, the RCM server may include or may communicate with a network slice controller to manage roaming configuration across 5G networks.

Figure 4C:
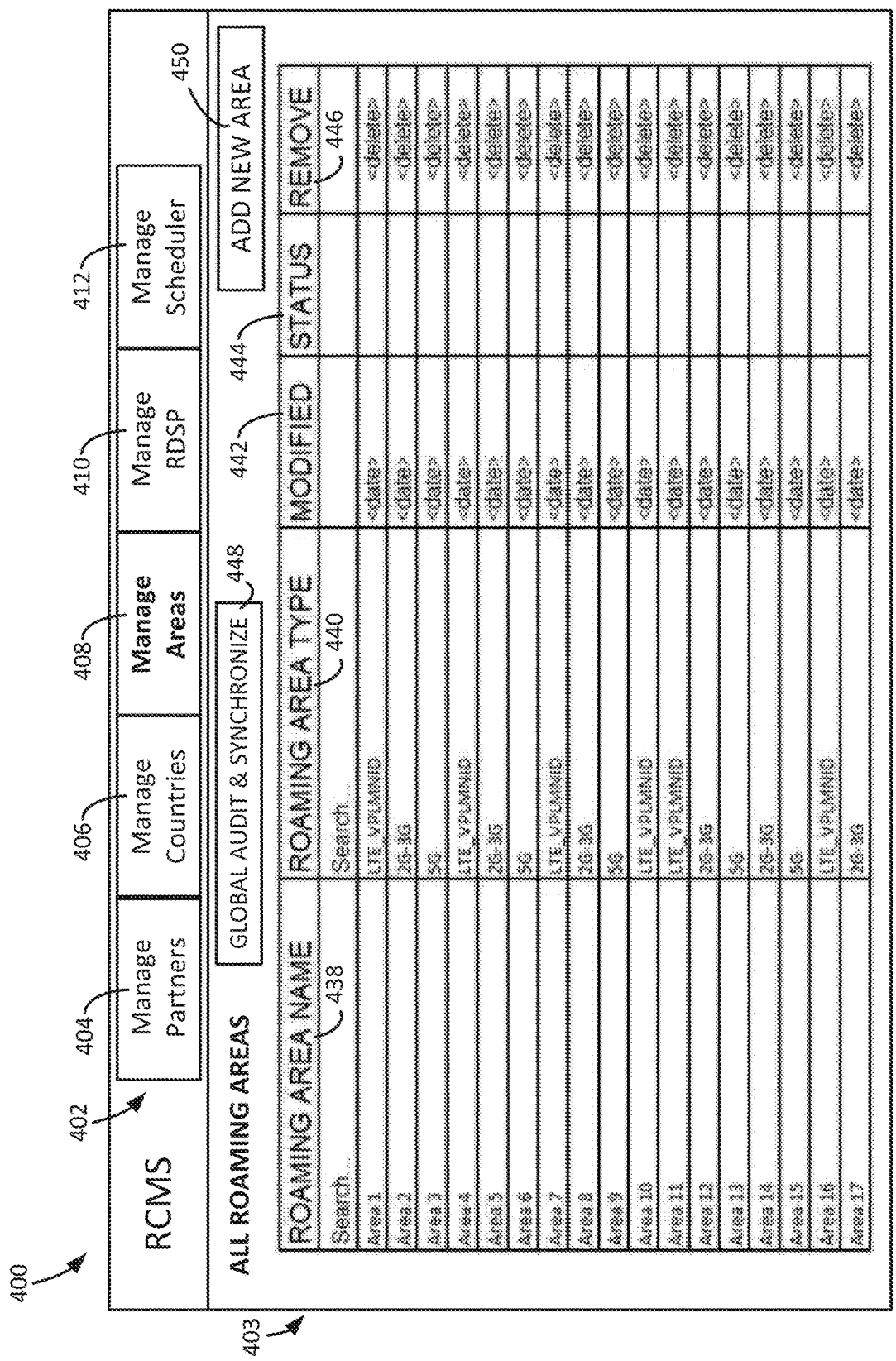
FIG. 4C is an exemplary embodiment of a graphical user interface for use in the roaming configuration management system in accordance with the disclosure.

The RCMS interface, either via the HTTPS reference point 203 or the SOAP reference point 205 may, include a graphical user interface (GUI) including data related to configuration information in varying formats. FIGS. 4A, 4B, 4C, 4D, and 4E show examples of exemplary layouts and screens of the RCMS interface 400. In some embodiments, the RCMS interface 400 may include at least a data selection portion 402 and a data configuration portion 403. The data selection portion 402 may include options to select from one or more data display and configuration options such as Manage Partners 404, Manage Countries 406, Manage Areas 408, Manage RDSP 410, Manage Scheduler 412. FIG. 4A shows an example of the RCMS interface 400 with the manage partners 404 data selection selected. In some embodiments, the Manage Partners 404 selection may show data in a column for all roaming partners 414 for the particular network operator. For each roaming partner, the data configuration portion 403 may indicate the country name 416 for that roaming partner, the "blocked status" 418 of the particular roaming partner (e.g., blocked or unblocked), and status selections 420 to select whether the status of a roaming partner should be blocked, unblocked, or another option. In some embodiments, the RCMS interface 400 may further include search options for each data column. For example, a user searching for data to manage a particular roaming partner may enter that roaming partner's name into the search box in the partner name 414 to show country name and blocked status for the identified partner. In some embodiments, the data configuration portion 403 of the Manage Partners 404 selection may include an Add New Partner button 422 that may be selected of a user would like to add a new roaming partner to the database.

FIG. 4B shows an example screen shot of the RCMS interface 400 with the Manage Countries 406 tab selected. In some embodiments, the data configuration portion 403 under the Manage Countries 406 tab may display all countries for which data may be available for roaming configuration by the network operator. The data configuration portion 403 may include one or more columns of data, such as country 424, MCCs 426, country code 428, country short name 430, modified data 432, and remove option 434. The country column 424 may list all the countries for which data configuration may be available in the RCMS interface. In some embodiments, the RCMS interface 400 may include a search feature under the country column 424 with which a user may filter the data by specific countries. The MCC column 426 may include the mobile country code for each country, the country code column 428 may include the country code for each country, and the country short name column 430 may include abbreviated three-letter codes for each country. The date modified column 432 may display the last date in which data for a particular country may have been modified by a user. The remove option 434 may provide a selectable option to remove the data for a particular country, and the add new country button 436 may provide a selectable option to add a new country and corresponding data to the Manage Countries 406 tab.

FIG. 4C shows an example screen shot of the RCMS interface 400 with the Manage Areas 408 tab selected. In some embodiments, the data configuration portion 403 under the Manage Areas 408 tab may display all roaming areas for which data may be available for roaming configuration by the network operator. The data configuration portion 403 may include one or more columns of data, such as roaming area name 438, roaming area type 440, modified date 442, status 444, and remove option 446. The roaming area name may list all roaming areas. In some embodiments, a roaming area may be defined using a group of roaming partners and/or a group of country names. In some embodiments, each roaming area may represent a list of VPLMN-ID and/or ISDNs base on roaming partners. In some embodiments, the RCMS may provide the roaming partners associated with a particular MCC and include the VPLMN-IDs and ISDNs under the particular roaming area. In some embodiments, a single roaming partner or MCC may be a part of multiple roaming areas. The roaming area type column 440 may include details regarding the type of roaming area corresponding to the particular roaming area. For example, LTE_VPLMNID, 2G-3G, 5G, etc, may be at least some roaming area types that may be listed. The date modified column 442 may list the most recent date in which the particular roaming area configuration may have been edited. The remove option 446 may provide a selectable option to remove the data for a particular roaming area, and the add new area button 450 may provide a selectable option to add a new roaming area and corresponding data to the Manage Areas 406 tab. In some embodiments, the Manage Areas 408 tab may include a global audit & synchronize button 448 that may provide additional options.

FIG. 4D shows an example screen shot of the RCMS interface 400 with the Manage RDSP 410 tab selected. Selection of the Manage RDSP 410 tab may show information on the data configuration portion 403 relating to roaming dependent services profiles (RDSP). For example, in some embodiments, the data configuration portion 403 may include all roaming subscription information in columns of data, such as Roaming Subscription Info (RSI) name 422, RSI type 454, Modified date 456, Modified By 458, and Status 460.

Figure 4E:
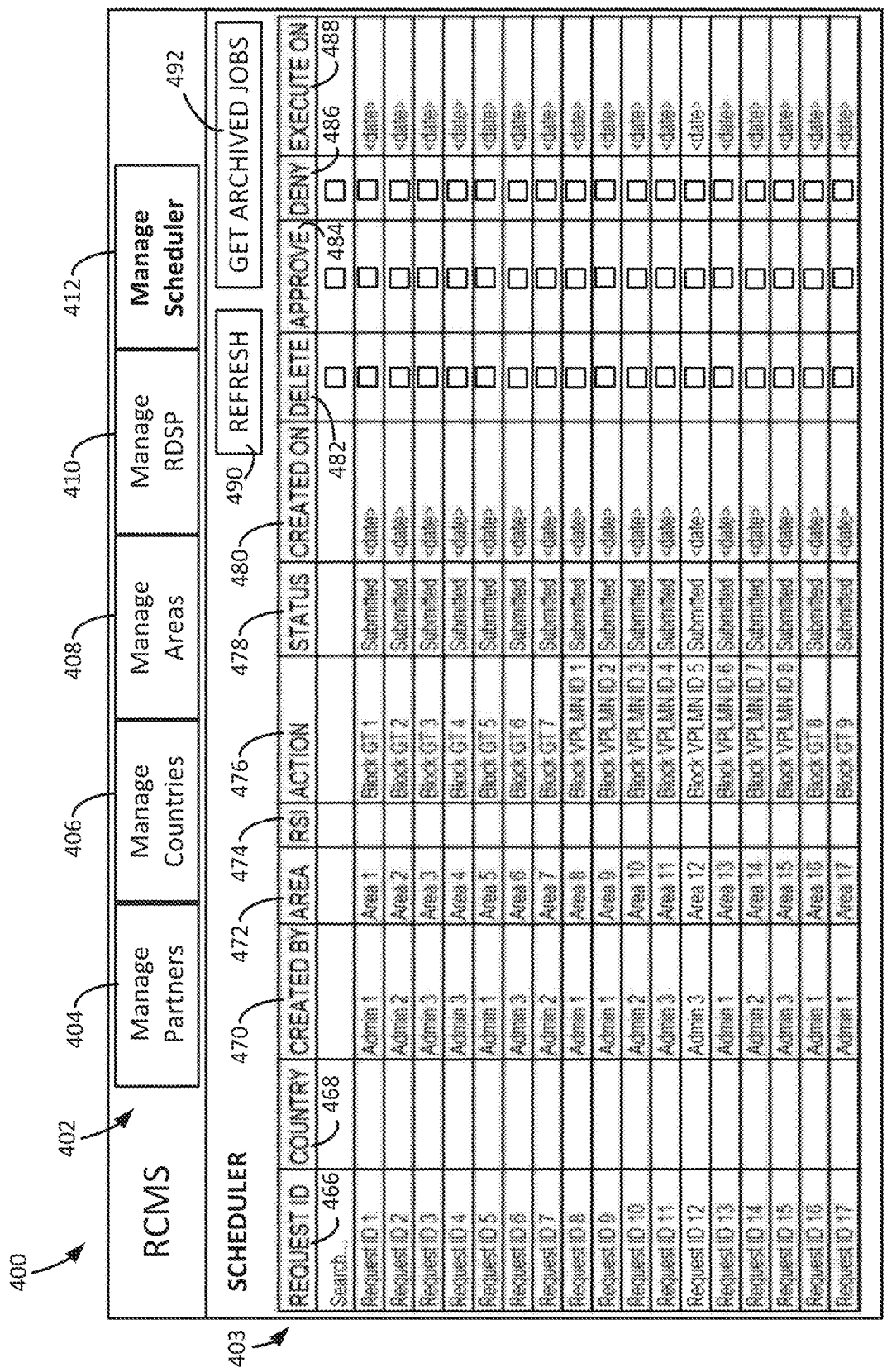
FIG. 4E is an exemplary embodiment of a graphical user interface for use in the roaming configuration management system in accordance with the disclosure.

FIG. 4E shows an example screen shot of the RCMS interface 400 with the Manage Scheduler 412 tab selected. Selection of the Manage Scheduler 412 tab may cause the data configuration portion 403 to provide data relating to a scheduler for roaming configuration requests. The data configuration portion 403 may include scheduler information in columns of data, such as Request ID 466, country 468, created by 470, area 472, RSI 474, Action 476, Status 478, Created On 480, and Execute On 488. The request ID in the Request ID 466 column may be generated by the RCMS when a configuration request is initially submitted by an administrator, user, etc. The country in the Country 468 column and the Area 472 column may include a particular country to which the specific request may pertain, if any, and the roaming area, respectively. The Created By 470 column may list the user or administrator ID who submitted the request, and the Created On 480 column may include the date on which the request originated. The Action 476 column may include a description of the action that the request is meant to accomplish. For example, the request may involve blocking particular global titles (e.g., Block GT 1) or blocking particular VPLMN-IDs or ranges (e.g., Block VPLMN ID 1). The Status 478 column may indicate the status of the action requested, and the Execute On 488 column may indicate the date upon which the action is scheduled to take place. The Manage Scheduler 412 tab may also include a Delete 482, Approve 484, and/or Deny 486 column, in which a user or administrator may make a selection to delete, approve, or deny a particular request. In some embodiments, the Manage Scheduler 412 tab may also include a refresh button 490 that may refresh the scheduler to include any recently submitted requests, and a get archived jobs button 492 that may allow a user to refer to archived actions that may have already been executed or deleted.

Figure 5:
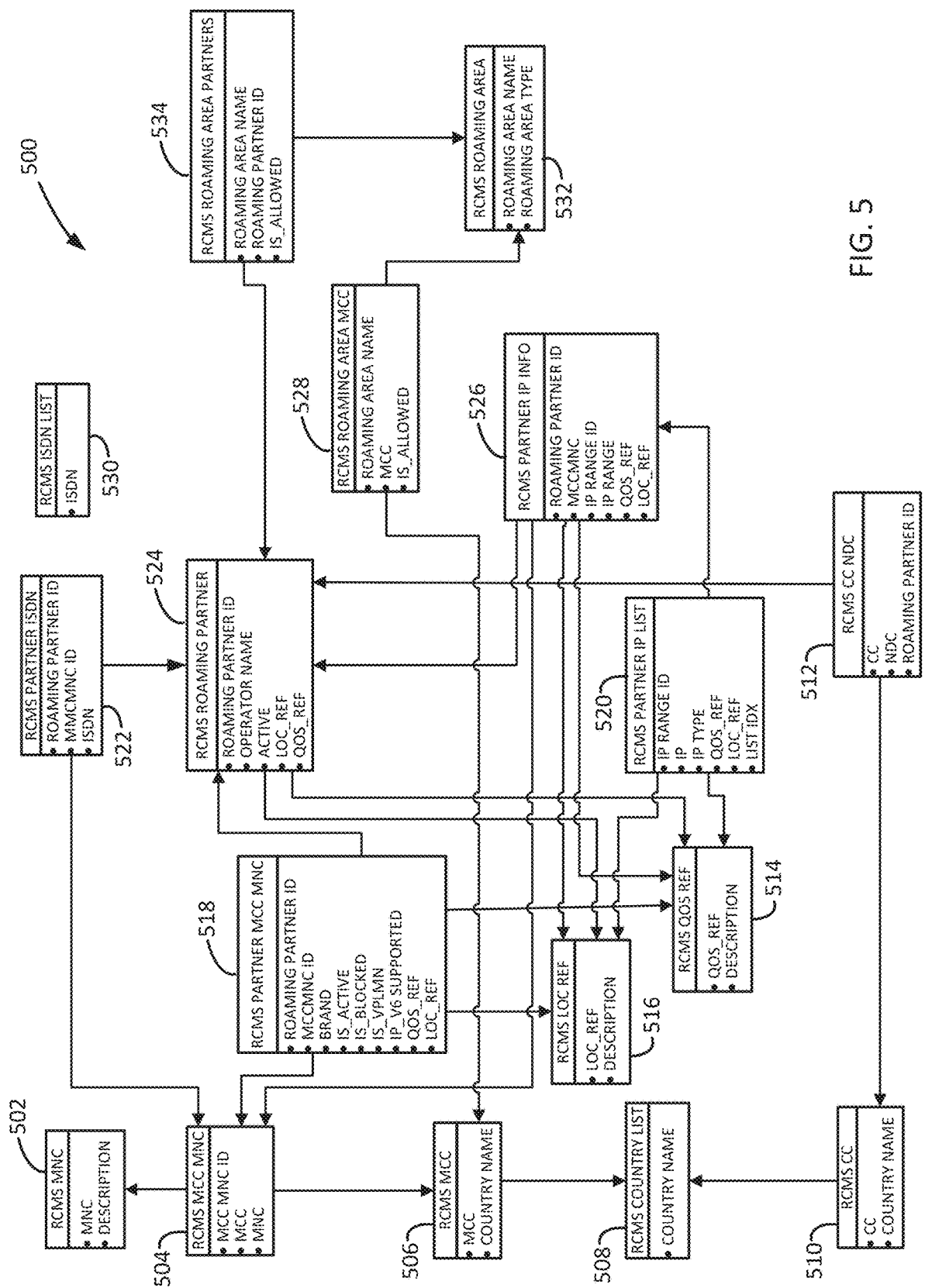
FIG. 5 is an embodiment of a database schema that may be used in the roaming configuration management system in accordance with the disclosure.

The data provided in the RCMS interface 400 may be stored in an RCMS database, which may be housed in the RCM server 202 or in another accessible location or locations. FIG. 5 shows an embodiment of a database schema 500 for the RCMS database. The data schema 500 may include structures for RCMS MNC 502, RCMS MCC MNC 504, RCMS MCC 506, RCMS COUNTRY LIST 508, RCMS CC 510, RCMS CC NDC 512, RCMS QOS REF 514, RCMS LOC REF 516, RCMS PARTNER MCC MNC 518, RCMS PARTNER IP LIST 520, RCMS PARTNER ISDN 522, RCMS ROAMING PARTNER 524, RCMS PARTNER IP INFO 526, RCMS ROAMING AREA MCC 528, RCMS ISDN LIST 530, RCMS ROAMING AREA 532, and RCMS ROAMING AREA PARTNERS 534. Each data structure my include data values, and may provide data values to other data structures as indicated in the arrows in the RCMS data schema 500. Those of skill in the art will understand, however, that other data structures may be usable within the scope of the disclosure.

Figure 6:
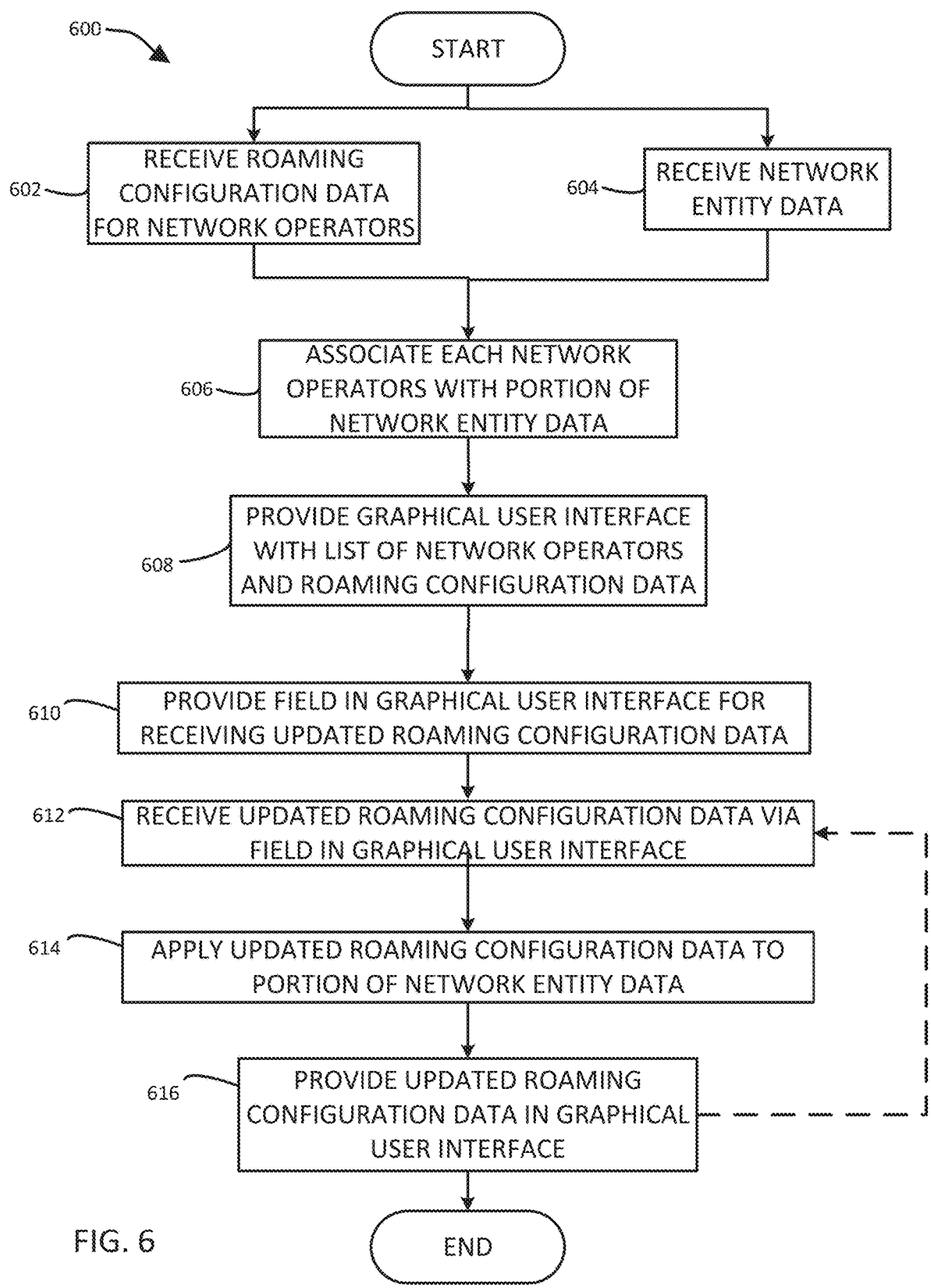
FIG. 6 is a flowchart of an embodiment of a method of roaming configuration management using the roaming configuration management system in accordance with the disclosure.

FIG. 6 shows a flowchart of an embodiment of a method 600 for using the RCMS as described herein. It should be understood, however, that other methods of using the RCMS may also be within the scope of this disclosure. At 602, the method may include receiving roaming configuration data for one or more network operators. In some embodiments, the network operators may be any number of network operators providing cellular network services around the world. At 604, the method may include receiving network entity data that may, in some embodiments, be associated with one or more roaming areas. In some embodiments, the network entity data may include a list or lists of varying types of entity date that may be contained within the one or more roaming areas. For example, the network entity data may include lists of global title, MME, MCCMNC/VPLMID, ISDN, or any other roaming based aggregated data that may be defined by a network operator and that may need configuring in systems that may be associated with the network operator in a roaming area. At 606, the method may include associating each network operator with a portion of the network entity data. In some embodiments, this may include assigning roaming partners from the network operators that may include grouping the network entity data based on the particular roaming partners (e.g., based on the network operators). For example, in some embodiments, this may include grouping ISDNs and VPLMN-IDs associated with a particular network operator in a roaming area together under the umbrella of a roaming partner (e.g., the network operator) for the associated roaming area. At 608, the method may include providing a graphical user interface that may include at least a list of the one or more network operators, the roaming configuration data for the respective network operators, and the roaming areas. Of course, various additional information may be included in the graphical user interface as illustrated and described herein with respect to FIGS. 4A-4E. At 610, the method may include providing at least one field in the graphical user interface for receiving updated roaming configuration data for each of the one or more network operators. For example, in FIG. 4A, the RCMS interface 400 may include a status column 420 that may include fields for updating the roaming configuration data (e.g., status) for a roaming partner 414 in a particular roaming area 416. At 612, the method may include receiving updated roaming configuration data view the at least one field for receiving updated roaming configuration data in the graphical user interface for at least one of the one or more network operators. In some embodiments, the update in the field may be provided by a user input, by another external application, etc. At 614, the method may include applying updated roaming configuration data to the portion of the network entity data associated with the associated one or more network operators. At 616, the method includes providing the updated roaming configuration data in the graphical user interface.

Figure 7:
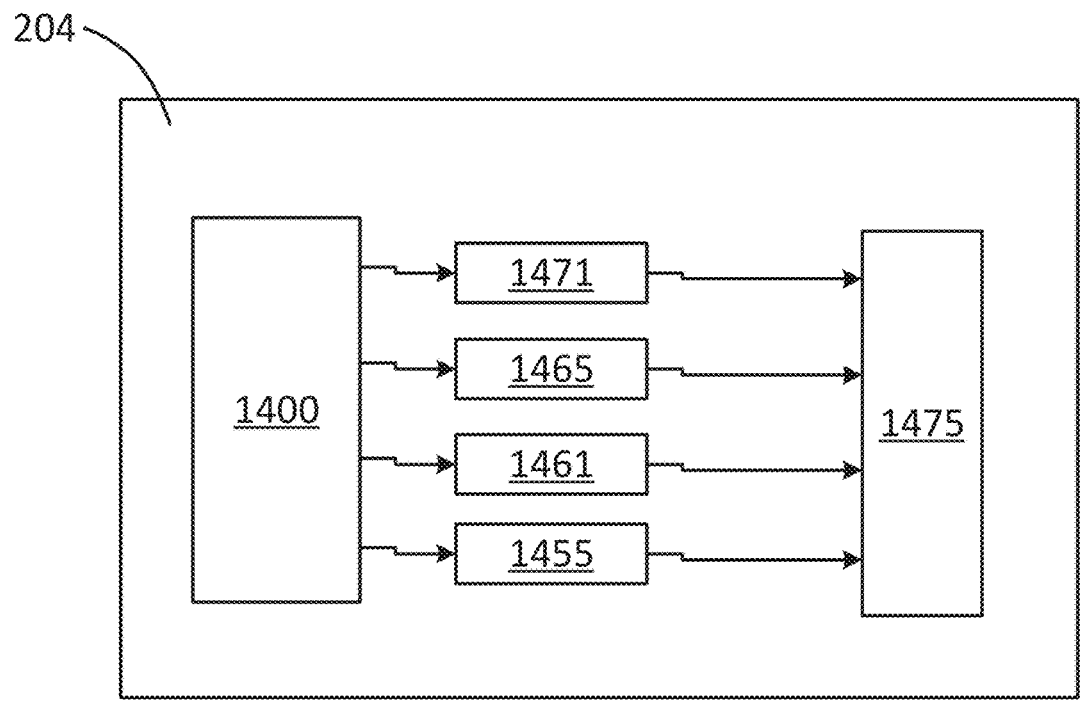
FIG. 7 is a schematic illustration of elements of an embodiment of an example computing device.
Figure 8:
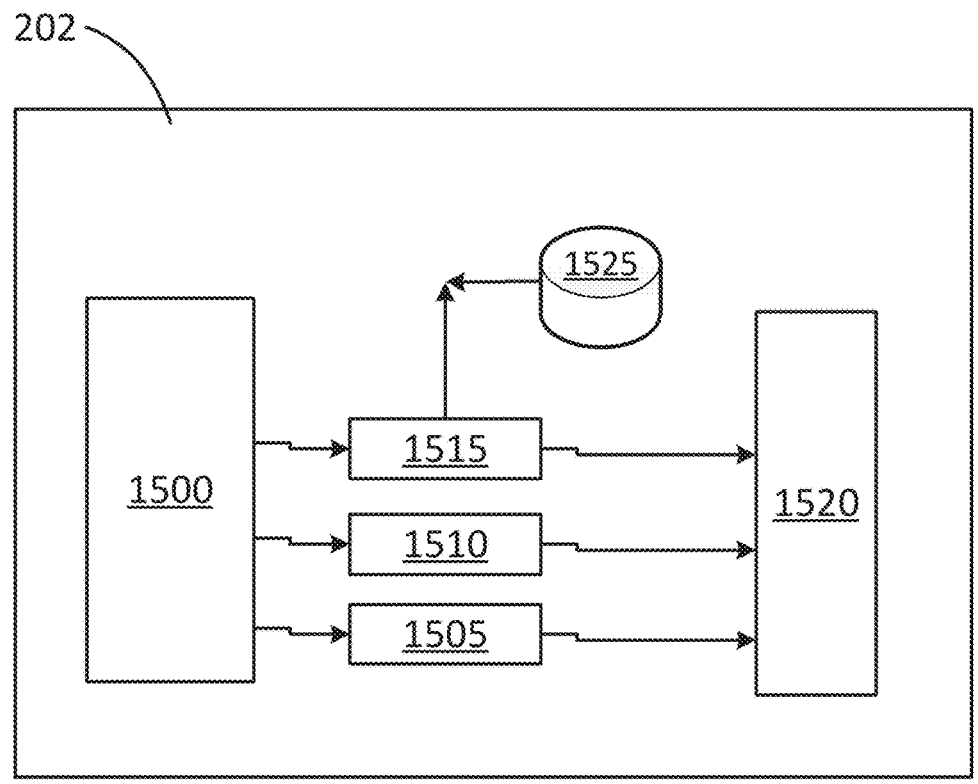
FIG. 8 is a schematic illustration of elements of an embodiment of a server type computing device.

FIG. 7 is a simplified illustration of the physical elements that make up an embodiment of a computing device, such as the administrator computer 204, and FIG. 8 is a simplified illustration of the physical elements that make up an embodiment of a server type computing device, such as the RCM server 202. Referring to FIG. 7, a sample computing device is illustrated that is physically configured according to be part of the RCMS. The computing device 204 may have a processor 1451 that is physically configured according to computer executable instructions. In some embodiments, the processor may be specially designed or configured to optimize communication between a server such as RCM server 202 and the computing device 204 relating to the RCMS described herein. The computing device 204 may have a portable power supply 1455 such as a battery, which may be rechargeable. It may also have a sound and video module 1461 which assists in displaying video and sound and may turn off when not in use to conserve power and battery life. The computing device 204 may also have volatile memory 1465 and non-volatile memory 1471. The computing device 204 may have GPS capabilities that may be a separate circuit or may be part of the processor 1451. There also may be an input/output bus 1475 that shuttles data to and from the various user input/output devices such as a microphone, a camera, a display, or other input/output devices. The computing device 204 also may control communicating with networks either through wireless or wired devices. Of course, this is just one embodiment of a computing device 204 and the number and types of computing devices 204 is limited only by the imagination.

The physical elements that make up an embodiment of a server, such as the RCM server 202, are further illustrated in FIG. 8. In some embodiments, the RCM server may be specially configured to run the RCMS as described herein. At a high level, the RCM server 202 may include a digital storage such as a magnetic disk, an optical disk, flash storage, non-volatile storage, etc. Structured data may be stored in the digital storage a database, such as a the RCMS database. More specifically, the server 202 may have a processor 1500 that is physically configured according to computer executable instructions. In some embodiments, the processor 1500 can be specially designed or configured to optimize communication between a computing device, such as computing device 204, and the server 202 relating to the RCMS as described herein. The server 202 may also have a sound and video module 1505 which assists in displaying video and sound and may turn off when not in use to conserve power and battery life. The server 202 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, an RCMS controller for running an RCMS application or API may be located on the computing device 204. However, in other embodiments, the RCMS controller may be located on RCM server 202, or both the computing device 204 and the server 202. Of course, this is just one embodiment of the RCM server 202 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for improving roaming configuration efficiency, the method comprising:
   providing a graphical user interface (GUI) including roaming configuration data for each of one or more roaming partner network operators;
   receiving, at a roaming configuration management (RCM) server and via the GUI, updated roaming configuration data for a first roaming partner network operator of the one or more roaming partner network operators and updated roaming configuration data for a second roaming partner network operator of the one or more roaming partner network operators;
   applying, by the RCM server, the updated roaming configuration data for the first roaming partner network operator to a first set of network entity data associated with the first roaming partner network operator and the updated roaming configuration data for the second roaming partner network operator to a second set of network entity data associated with the second roaming partner network operator; and
   providing, by the RCM server and via the GUI, the updated roaming configuration data for the first and second roaming partner network operators.

2. The method of claim 1 further comprising receiving a first custom set of rules for the first roaming partner network operator and a second custom set of rules for the second roaming partner network operator.

3. The method of claim 1, wherein applying the updated roaming configuration data to the first roaming partner network operator includes blocking roaming access associated with the first roaming partner network operator.

4. The method of claim 1, wherein applying the updated roaming configuration data to the second roaming partner network operator includes unblocking roaming access associated with the second roaming partner network operator.

5. The method of claim 1, wherein the GUI is configured to display at least:
   a first roaming partner network operator name of the first roaming partner network operator;
   a second roaming partner network operator name of the second roaming partner network operator;
   a roaming area name; and
   a status associated with each of the first and second roaming partner network operators.

6. The method of claim 5, wherein the status includes one of a blocked status or an unblocked status.

7. The method of claim 1, wherein the GUI is configured to include fields for receiving a first input related to a status of the first roaming partner network operator and a second input related to a status of the second roaming partner network operator.

8. The method of claim 7, wherein the first and second inputs are received from a user.

9. The method of claim 7, wherein the first and second inputs are received from an external application.

10. A computer-implemented method of improving roaming configuration efficiency, the method comprising:
    providing, by a roaming configuration management (RCM) server, a graphical user interface (GUI) including at least a list of one or more roaming partner network operators;
    receiving, at the RCM server via a field for receiving updated roaming configuration data in the GUI, updated roaming configuration data for at least one of the one or more roaming partner network operators;
    applying, by the RCM server, the updated roaming configuration data to network entity data associated with the at least one of the one or more roaming partner network operators; and
    providing the updated roaming configuration data for the at least one of the one or more roaming partner network operators in the GUI.

11. The method of claim 10 further comprising receiving a custom set of rules for each network operator of the one or more roaming partner network operators.

12. The method of claim 10, wherein applying the updated roaming configuration data to the at least one roaming partner network operator of the one or more roaming partner network operators includes blocking roaming access associated with the at least one roaming partner network operator.

13. The method of claim 10, wherein applying the updated roaming configuration data to the at least one roaming partner network operator of the one or more roaming partner network operators includes unblocking roaming access associated with the at least one roaming partner network operator.

14. The method of claim 10, wherein the GUI is configured to display at least:
- a first roaming partner network operator name of the one or more roaming partner network operators;
- a second roaming partner network operator name of the one or more roaming partner network operators;
- a roaming area name; and
- a status associated with each of the first and second roaming partner network operators.

15. The method of claim 14, wherein the status includes one of a blocked status or an unblocked status.

16. The method of claim 10, wherein the field for receiving updated roaming configuration data is configured to receive a first input related to a status of a first roaming partner network operator of the one or more roaming partner network operators and a second input related to a status of a second roaming partner network operator of the one or more roaming partner network operators.

17. The method of claim 16, wherein the first and second inputs are received from a user.

18. The method of claim 16, wherein the first and second inputs are received from an external application.

19. A computer-implemented method of improving roaming configuration efficiency, the method comprising:
- providing, in a graphical user interface (GUI), at least one field for receiving updated roaming configuration data for one or more roaming partner network operators;
- receiving, via the at least one field, a first roaming configuration update including an instruction to block roaming access for a first roaming partner network operator of the one or more roaming partner network operators;
- receiving, via the at least one field, a second roaming configuration update including an instruction to unblock roaming access for a second roaming partner network operator one or more roaming partner network operators;
- in response to receiving the first roaming configuration update, blocking roaming access for the first roaming partner network operator;
- in response to receiving the second roaming configuration update, unblocking roaming access for the second roaming partner network operator; and
- providing the first and second roaming configuration updates in the GUI.

20. The method of claim 19 further comprising receiving a first custom set of rules for the first roaming partner network operator and a second custom set of rules for the second roaming partner network operator.

* * * * *